United States Patent Office.

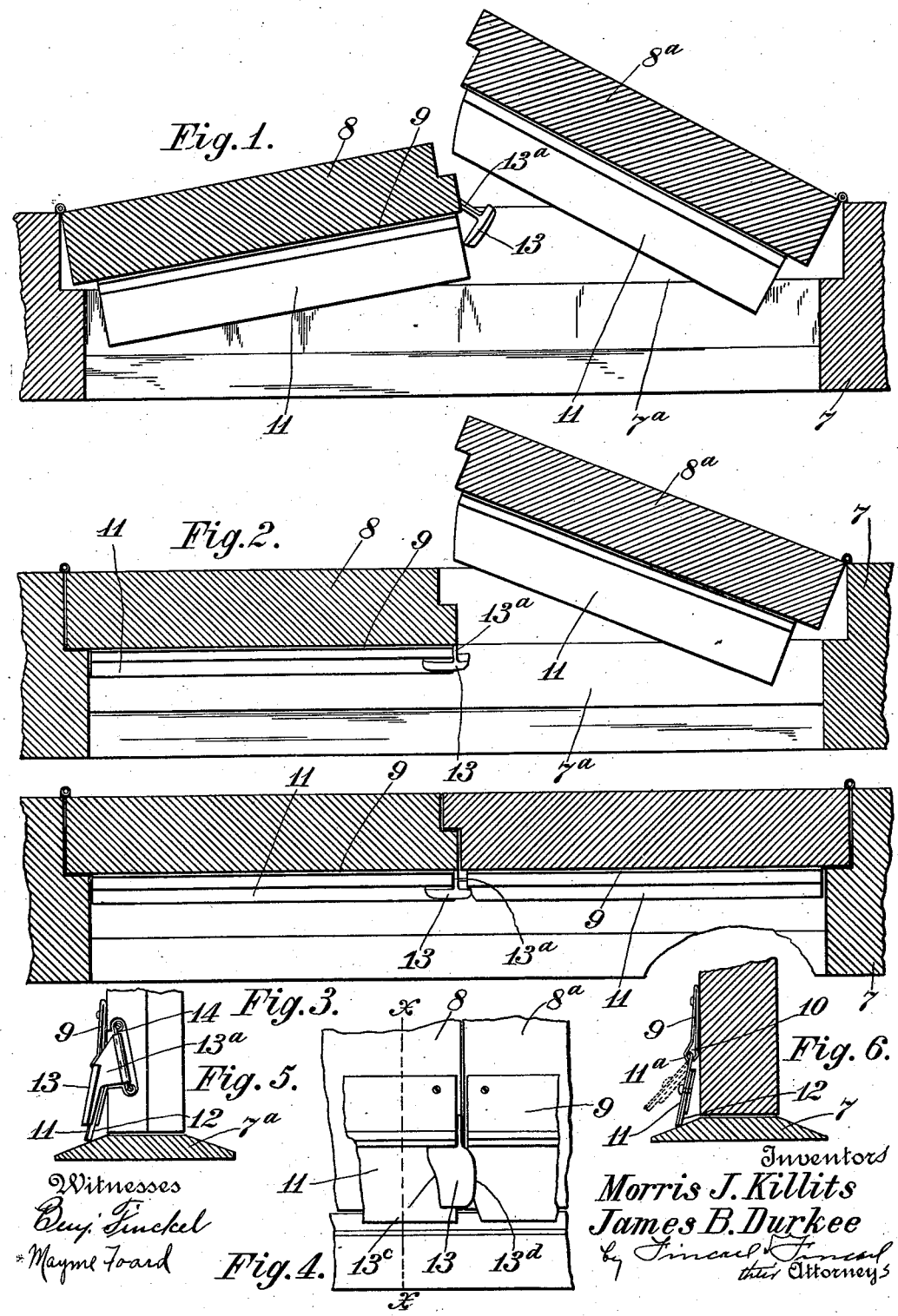

MORRIS J. KILLITS AND JAMES B. DURKEE, OF COLUMBUS, OHIO.

WEATHER-STRIP STOP.

1,010,150.     Specification of Letters Patent.     Patented Nov. 28, 1911.

Application filed January 23, 1911. Serial No. 604,072.

*To all whom it may concern:*

Be it known that we, MORRIS J. KILLITS and JAMES B. DURKEE, citizens of the United States, residing at Columbus, in the county of Franklin and State of Ohio, have invented a certain new and useful Improvement in Weather-Strip Stops, of which the following is a specification.

The object of this invention is more especially to provide an improved weather strip for double doors or analogous structures.

The invention is embodied in the construction herein shown and described and then particularly pointed out in the claims.

In the accompanying drawings—Figure 1 is a horizontal section (looking down) through a casing and a double door containing the invention showing both parts of the door open. Fig. 2 is a similar section showing the lever containing part of the door closed. Fig. 3 is a similar section showing both parts of the door closed. Fig. 4 is a detail in elevation showing the position of the weather strip operating lever acting to hold depressed the strips of both parts of the door. Fig. 5 is an edge view of that part of the door member that contains the weather strip operating lever, said lever being in that position where it holds the weather strip of said door member depressed or as seen in Figs. 2, 3 and 5. Fig. 6 is a vertical section on the line $x$—$x$ Fig. 4 to show further details of construction of the weather strip.

Like characters of reference designate corresponding parts in the several views.

7 designates the door casing; $7^a$ the carpet strip and 8 and $8^a$ designate the parts of the ordinary double door hung or hinged in the ordinary manner to the casing. Each part of the door has secured to the lower portion of its outer or weather side a movable strip comprising, in the instance shown, a stationary member 9 consisting of a folded strip of sheet metal bent at its free edges to form a longitudinal socket 10, and a second metal strip 11 flanged outwardly at its upper edge as seen at $11^a$ to enter said socket 10. The construction is such that the outer portion of the stationary member 9 constitutes a spring that normally presses on the flange $11^a$ and tends to hold the strip 11 upward as best shown by broken lines Fig. 6. The metal strip 11 has riveted to its under side a strip 12 of felt, rubber or other suitable soft material, and said strip 11 constructed as shown can be slid into and out of its socket.

The lever or stop device for operating or depressing the movable parts of the weather strip comprises a head portion 13 with a shank $13^a$. The shank portion $13^a$ is hinged upon an inclined pintle 14 secured in a suitable socket in the edge of the door member 8 as best seen in Fig. 5. The head portion 13 has its left hand edge as seen at $13^c$ in Fig. 4 inclined so that when shoved against the movable part of the weather strip from the open position seen in Fig. 1 said inclined edge $13^c$ acts with a cam-like action on the end of said portion of the weather strip to depress the same toward the carpet strip $7^a$ as seen in Fig. 5. When the movable part of the weather strip is thus depressed the operating device is latched in place as seen in Fig. 2 by reason of the upward pressure of the movable weather strip member but it can be dislodged at any time desired by a slight lateral tap with the toe of the shoe. Ordinarily the member 8 of a double door is left closed, ingress and egress of persons being mostly through the side closed by the door part $8^a$. The movable weather strip member of the part $8^a$ is closed or depressed by the lateral projection $13^d$ which automatically acts on the weather strip of said door member after or while the door member 8 is closed. The end of the movable portion of the weather strip on the door member $8^a$ is slightly rounded off from its lower corner so as to prevent interference and permit that member to be closed when the other member 8 is closed.

With this construction it will be observed that the operation of the weather strip is automatic (except as to the release of the stop or strip operating lever) hence the weather strip can be depressed to weather-excluding position by closing the door from the inside of the house. The strip operating lever or stop is hung on an inclined pintle so that the head portion thereof shall tend to lie next the outer corner of the door member 8.

Our invention is not limited in its practical construction to precisely the forms of the parts shown because its essence can be embodied in obvious modifications of such forms.

What we claim is:

1. In combination with a double door or the like, a movable weather strip on each of the parts of said door, a lever to depress said strips consisting of a head portion and a shank, means for inclinedly hinging said shank to one of the parts of the door, and said head portion constructed to be operated by the other part of the door and act as a cam on the weather strip of the part of the door containing said lever substantially as described.

2. In combination with a double door or the like, a movable weather strip on the parts of said door, a device on one of the parts of said door adapted to be operated by the closing of the other part of the door to depress to weather excluding position the strip upon the part of the door containing said depressing device.

3. In combination with a double door or the like, a movable weather strip on each of the parts of said door, a device on one of the parts of said door adapted to be operated by the closing of the other part of the door to depress to weather excluding position the strips upon both parts of the door.

4. In combination with a double door or the like, a movable weather strip on each of the parts of said door, a lever to depress said strips consisting of a head portion and a shank hinged to one of the parts of the door, said head portion constructed to act as a cam on the weather strip of the part of the door containing said lever, and to act as a stop to depress the weather strip of the other part of the door.

MORRIS J. KILLITS.
JAMES B. DURKEE.

Witnesses to both signatures:
BENJAMIN FINCKEL,
MAYME FOARD.

---

Copies of this patent may be obtained for five cents each, by addressing the "Commissioner of Patents, Washington, D. C."